W. L. HOWARD.
VEHICLE WHEEL.
APPLICATION FILED MAY 21, 1914.
1,135,804.
Patented Apr. 13, 1915.
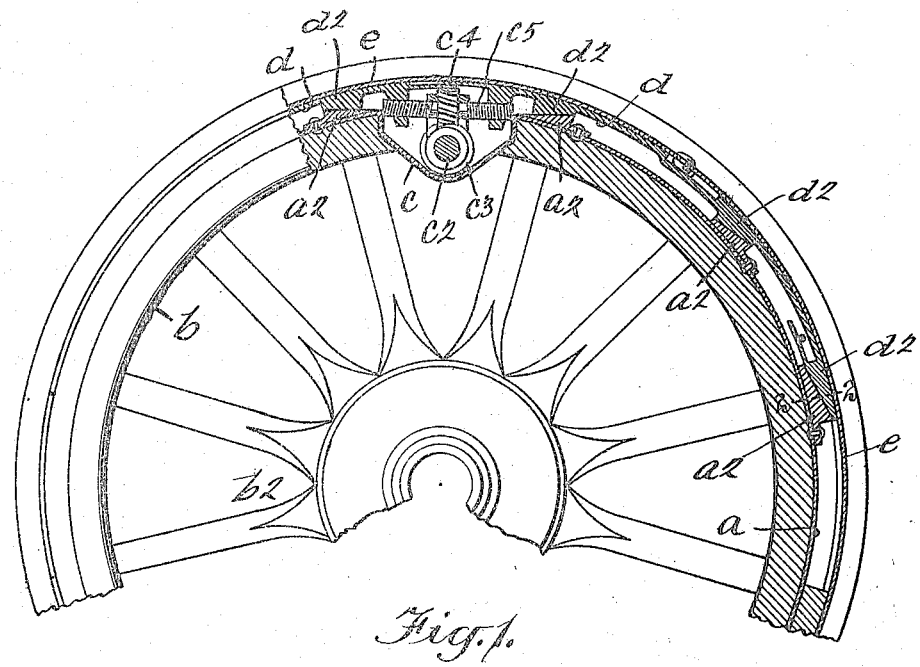
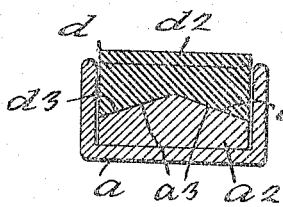
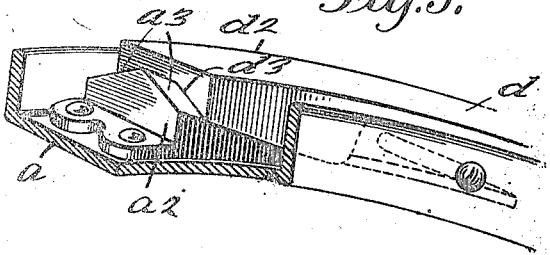
WITNESSES
INVENTOR
William L. Howard
BY
ATTORNEYS

UNITED STATES PATENT OFFICE.

WILLIAM LEWIS HOWARD, OF TRENTON, NEW JERSEY.

VEHICLE-WHEEL.

1,135,804.

Specification of Letters Patent.

Patented Apr. 13, 1915.

Application filed May 21, 1914. Serial No. 839,998.

*To all whom it may concern:*

Be it known that I, WILLIAM L. HOWARD, a citizen of the United States, and a resident of Trenton, in the county of Mercer and State of New Jersey, have invented certain new and useful Improvements in Vehicle-Wheels, of which the following is a specification.

My invention relates to means for securely holding demountable rims in place on a wheel, especially adapted for use in connection with automobile wheels, and is an improvement over the form shown and described in Letters Patent No. 1,031,341, issued to me July 2, 1912, and the main object of the present invention is to provide means, in connection with the structure shown in said Letters Patent, for preventing the creep of the rim; a further object is to accomplish this result by a relatively slight change in the wedges and gripping members shown in said Letters Patent, and without any alteration in the parts of the device, therein shown, as to general arrangement or operation.

The improvement above referred to is illustrated in the accompanying drawings, in which—

Figure 1 is a fragmentary, side elevation, of a vehicle wheel provided with my invention, and partly in section; Fig. 2 is an enlarged section taken on the line 2—2 of Fig. 1; and Fig. 3 is a fragmentary, perspective, sectional, view of the parts embodying my invention.

In my present invention are incorporated all the parts shown and described in the Letters Patent referred to, including the channel rim $a$ mounted on the felly $b$ of the wheel $b^2$, the wedge blocks $a^2$ secured to said rim, the casing $c$ having the shaft $c^2$ therein provided with the worm $c^3$ engaged with the worm gear $c^4$ mounted upon the reversely threaded screw $c^5$ in turn engaged with the gripping members $d$, and the projections $d^2$ on which are inclined similarly to the corresponding wedge blocks $a^2$ on their contacting surfaces, whereby, when said screw $c^5$ is rotated, by means of the shaft $c^2$ and the worm gear connection, in either direction, said gripping members engage the demountable rim $e$ or are disengaged therefrom, all in the manner set forth in the said Letters Patent.

The invention proper resides in the novel formation, or configuration, of the contacting surfaces of the wedge blocks $a^2$ and gripping member projections $d^2$, the former, while still presenting the inclined cam surface, being rigid in the central plane of the wheel, as clearly shown in Figs. 2 and 3, at $a^3$, the said projections being similarly recessed, as shown at $d^3$, thereby preventing any lateral movement of these parts upon each other, and preventing the rim $e$ from creeping, this prevention of lateral movement of the gripping members being independent of the channeled formation of the rim $a$, as will be seen. As stated, this additional feature requires no change in any of the parts other than the wedge blocks and the gripping member projections, but the result on the immovability of the demountable rim $e$, over the construction shown in said Letters Patent, is greatly enhanced, and without additional cost in construction.

What I claim as new, and desire to secure by Letters Patent, is—

A fixed channel wheel rim provided with blocks $a^2$ constructed with an exterior central longitudinal projection or rib and a demountable rim, a pair of gripping members arranged opposite each other and having internal tapered projections $d^2$ provided with a central longitudinal groove conforming to and adapted to receive the aforesaid blocks, and a rotary screw having reversely threaded ends which connect said gripping members, as described.

In testimony whereof I have signed my name to this specification in presence of the subscribing witnesses.

WILLIAM LEWIS HOWARD.

Witnesses:
DANIEL H. SCRANTON,
MARY T. McCUE.